United States Patent [19]

Worthington

[11] 3,734,316
[45] May 22, 1973

[54] APPARATUS FOR CONTROLLING DIRECTION OF MOVEMENT OF REFUSE BODY COMPACTING AND UNLOADING BLADE

[76] Inventor: Stanley W. Worthington, 824 Clough, Waterloo, Iowa 50701

[22] Filed: Oct. 26, 1971

[21] Appl. No.: 192,587

Related U.S. Application Data

[63] Continuation of Ser. No. 54,982, July 15, 1970, abandoned.

[52] U.S. Cl.......................................214/82, 100/52
[51] Int. Cl..............................................B65f 3/00
[58] Field of Search....................214/82, 83.22, 83.3; 100/52

[56] References Cited

UNITED STATES PATENTS

| | | | |
|---|---|---|---|
| 3,049,256 | 8/1962 | Urban | 214/82 X |
| 3,220,586 | 11/1965 | Gollnick | 214/83.3 X |
| 3,252,600 | 5/1966 | Brisson | 214/82 X |

Primary Examiner—Robert G. Sheridan
Assistant Examiner—George F. Abraham
Attorney—Henderson & Strom

[57] ABSTRACT

The invention relates to a valve arrangement including a spool mounted within the valve body and positionable among first, neutral and second positions for controlling the passage of fluid through the valve; a detent mechanism for releasably holding the spool in a position subsequent to manual movement of the spool to the position; a plunger within the valve body and axially associated with the spool for relative movement therewith, the plunger subject to movement in relation to the position of a force applying member movable between two positions; a pair of oppositely acting springs axially interposed within the valve body between the sppol and the plunger for biasing the plunger toward a neutral position; and fluid pressure means operable in response to the member being resisted by a predetermined resistance to release the detent mechanism whereby automatic positioning of the plunger for controlly movement of the member is obtainable.

13 Claims, 13 Drawing Figures

Patented May 22, 1973  3,734,316
7 Sheets-Sheet 1
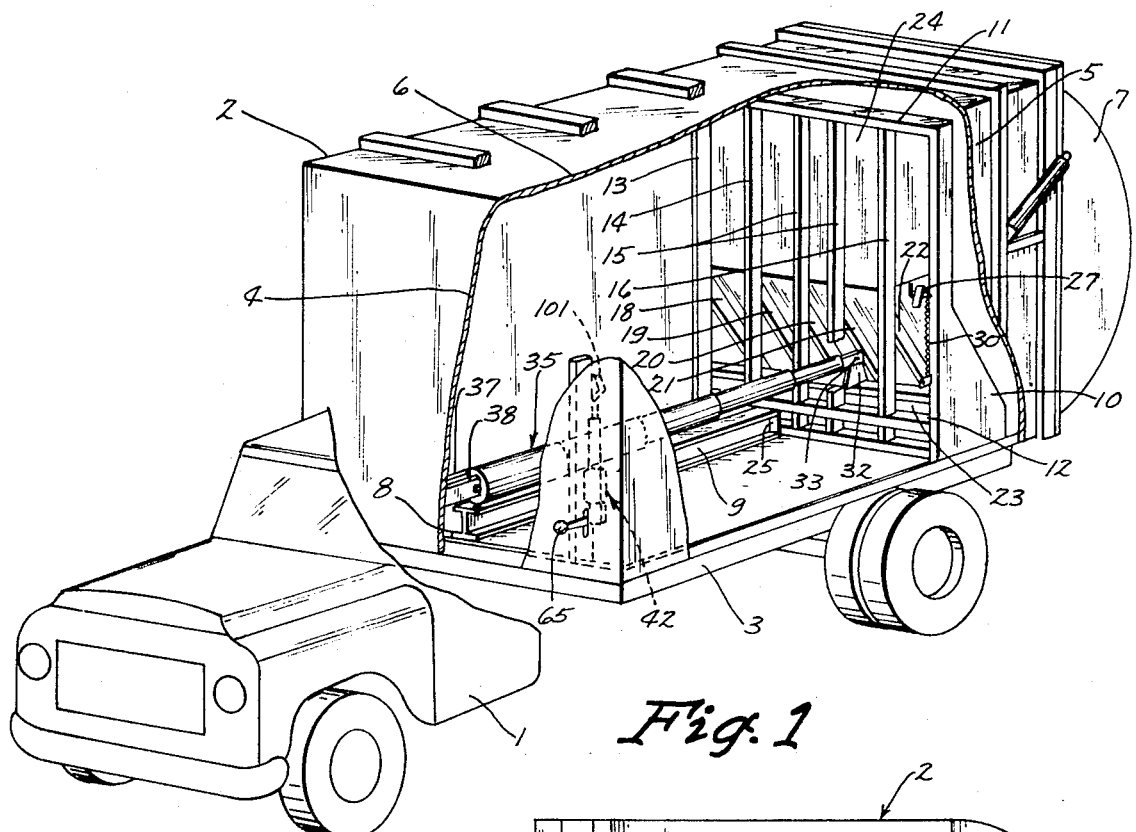
Fig. 1
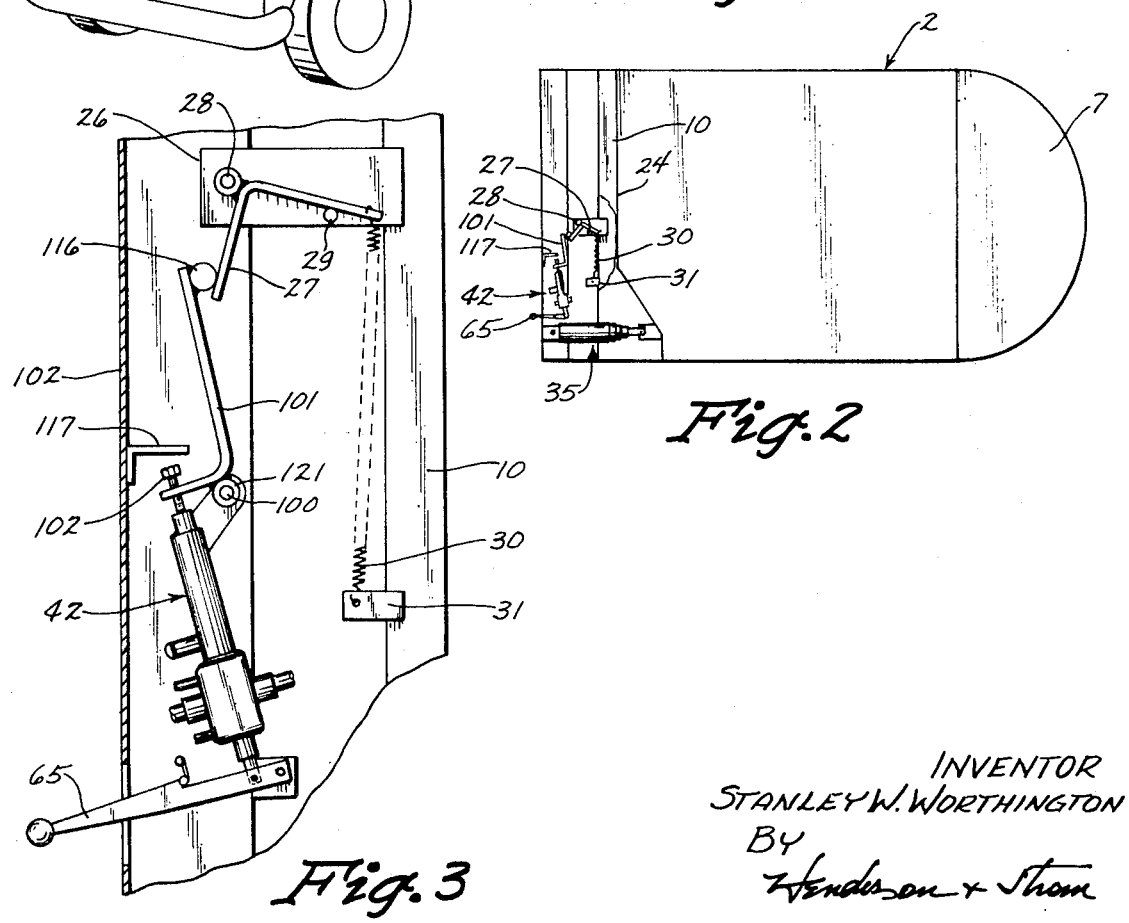
Fig. 2
Fig. 3
INVENTOR
STANLEY W. WORTHINGTON
BY
Henderson + Thom
ATTORNEYS INVENTOR
STANLEY W. WORTHINGTON
BY
Henderson + Show
ATTORNEYS

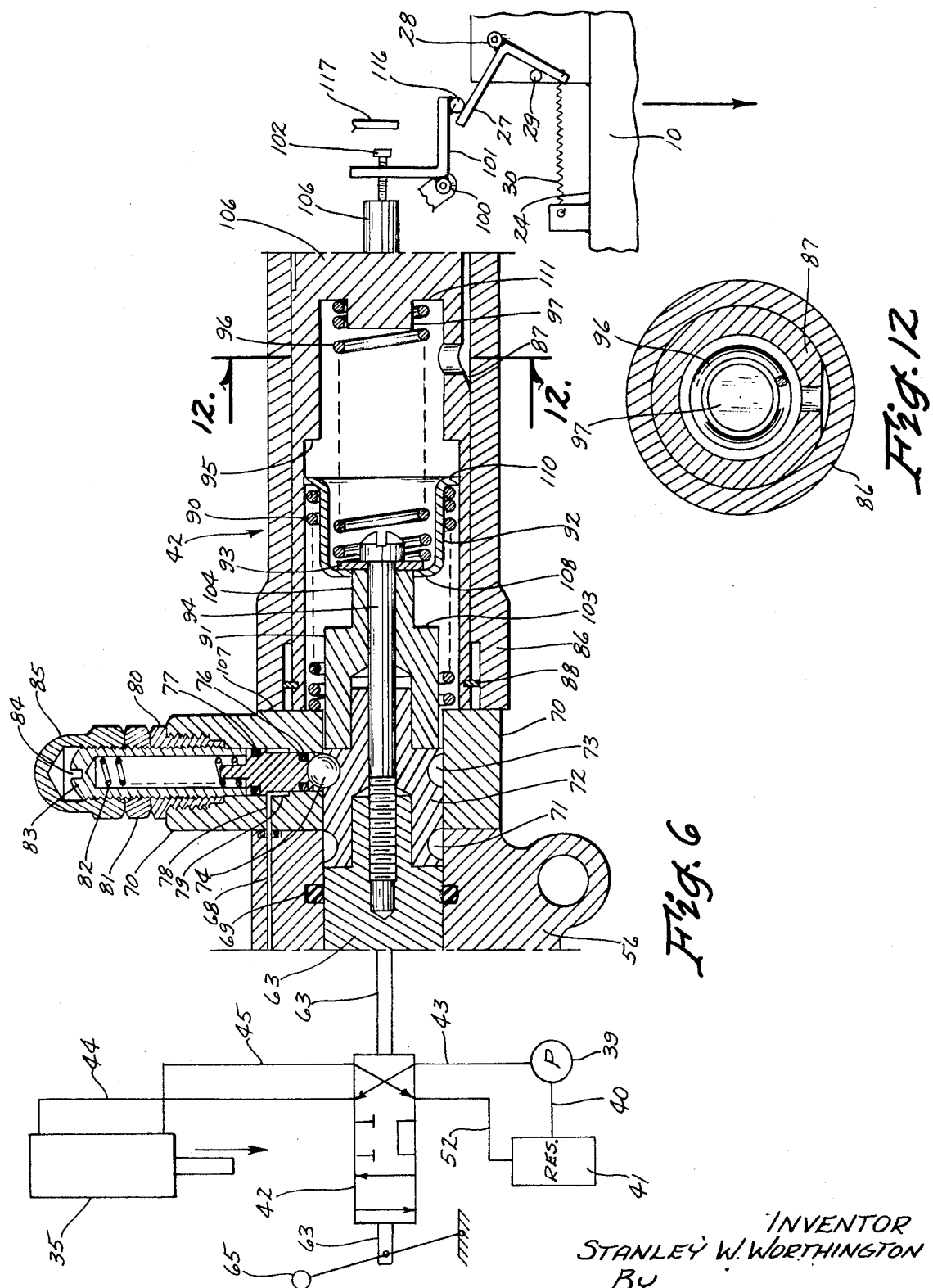

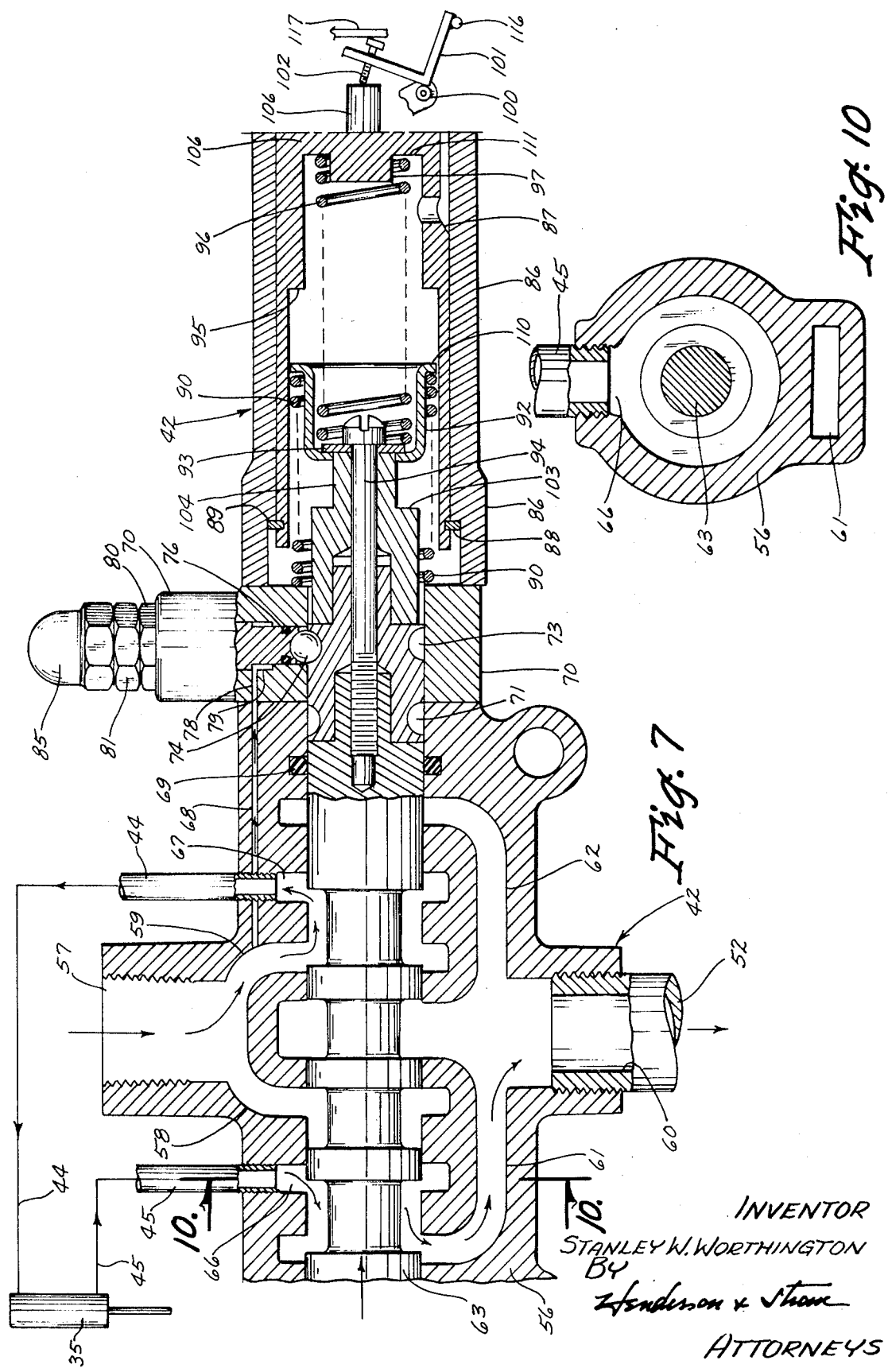

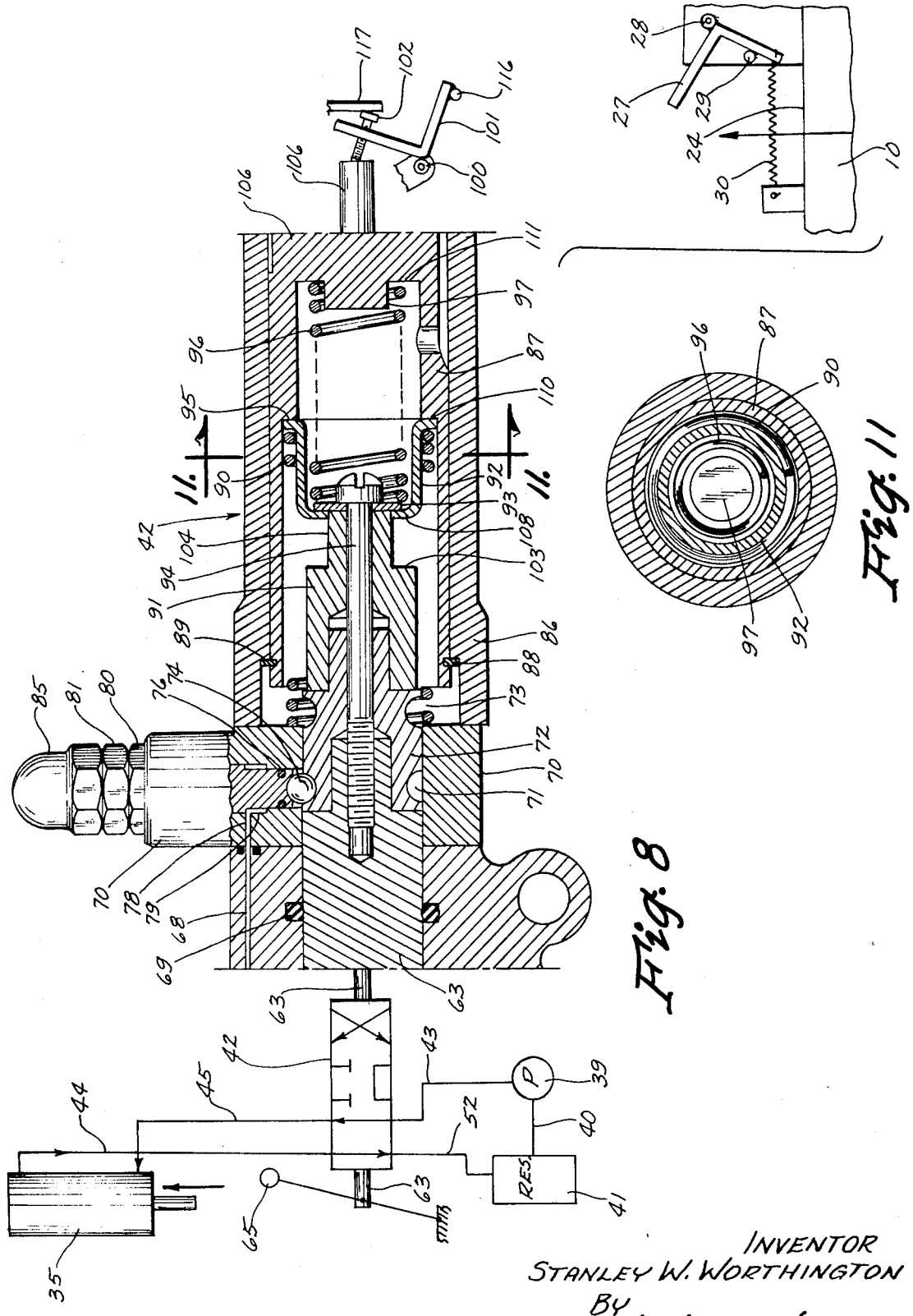

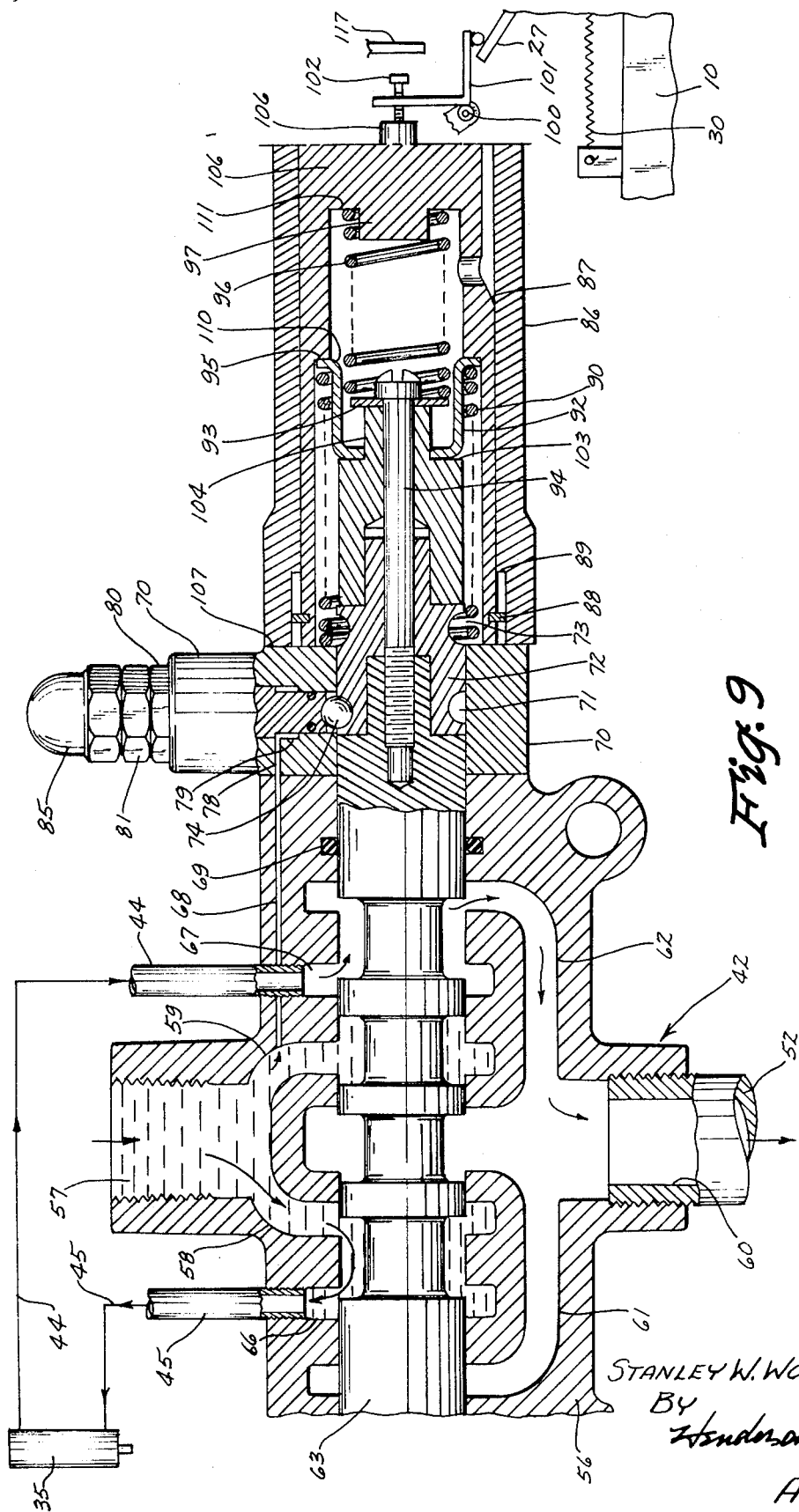

APPARATUS FOR CONTROLLING DIRECTION OF MOVEMENT OF REFUSE BODY COMPACTING AND UNLOADING BLADE

This is a continuation of application Ser. No. 54,982, filed July 15, 1970 now abandoned.

BACKGROUND OF THE INVENTION

The travel of a hydraulically-powered and reciprocating compacting and unlaoding blade such as that used in rear unloading refuse transporting truck bodies has never been completely automated. It normally has required a manual manipulation of a hydraulic valve for either expanding or contracting a hydraulic piston and cylinder actuating mechanism such that the operator had to attend and control the valve throughout the entire operation.

SUMMARY OF THE INVENTION

This invention relates to a new and novel means for automatically controlling and reversing the direction of travel of a hydraulically powered and reciprocating compacting and unloading blade, such as that used in rear unloading refuse transporting truck bodies. The automatic control is accomplished by a valve apparatus including an axially moveable spool for controlling the flow of fluid to and from a piston and cylinder device for reciprocating movement of a compacting and unloading blade, a pressure released detent mechanism for releaseably holding the spool in either of two positions for fluid control purposes, a plunger assembly moveable axially relative to the spool and responsive to the position of the blade, and spring biasing means interposed between the spool and the plunger for effecting relative movement therebetween in response to the position of the blade; the arrangement such that once the valve apparatus is manually set in a blade compacting condition, the blade is moved to a compacting position determined by the amount of fluid pressure applied to move the blade, such that when the pressure is reached, the valve apparatus is reversed permitting the piston and cylinder device to retract the blade toward its forwardmost position, and wherein when the latter position is attained, the valve apparatus is automatically moved to a neutral position again in response to the attainment of a predetermined amount of fluid pressure within the control system.

It is an object of this invention to provide a combination of manual and automatic control means, whereby compacting movement of the packing blade outward away from its starting or loading position may be initiated manually, with automatic control of subsequent movement through the remainder of the compacting stroke, reversal of direction, and return to starting position.

It is another object of this invention to provide a novel control for a packing and unloading mechanism which will cause the packing element to move against material subject to compaction until a predetermined resistance is attained.

A further object of the invention is to provide a means responsive to the pressure of the hydraulic fluid powering the motor operating the packing element which will cause the direction of travel of said element during its compacting stroke to be automatically reversed whenever resistance against it reaches a predetermined point.

A further object of this invention is to provide a position responsive means which will automatically arrest the return movement of the packing blade when the blade attains its loading position.

Yet a further object of this invention is to provide a means for automatically unloading the pressure of the fluid powering the movements of the blade whenever said blade is in its loading or starting position.

A further object of this invention is to provide a means whereby the outward and return movements of the packer blade and unloading of the hydraulic circuit proceeds automatically in sequence after compacting movement of the blade is initiated by manual positioning of the hydraulic control valve handle.

Still a further object of this invention is to provide a means whereby the operator may manually over ride the automatic control means at any time during the operating cycle and re-position the blade at any desired point of its travel.

Another object of this invention is to provide a mechanical means whereby the hydraulic control valve may be mechanically restrained in its neutral position, thereby arresting movement of the blade at any desired point of its outward or reverse travel.

A further object of the invention is to provide a yielding means, for energizing the return of the blade control valve to neutral, as an element of the valve actuating means, to compensate for variations in position of the blade with respect to said valve, resulting from manufacturing variations, deflections and/or misalignment of the blade.

Still another object of this invention is to provide a means whereby the hydraulic circuit is unloaded whenever movement of the compacting element is arrested through manual or automatic operation of the control valve.

Yet a further object of this invention is to provide a means for independently adjusting the rate of flow of hydraulic fluid to the respective sides of a piston within a hydraulic cylinder powering the packing and return movements of packing and unloading blade of a refuse container, whereby the travel speed of said blade may be independently established as desired.

It is still another object of this invention to provide an apparatus capable of accomplishing the above designated objectives which is economical of manufacture, effective in use, and efficient in operation. Further objects, features and advantages of this invention will become readily apparent from the following description and appended claims when read in view of the illustrations.

BRIEF DESCRIPTION OF THE DRAWINGS

FIG. 1 is a perspective view of a truck-mounted refuse body, with part of the body cut away, and showing assembled portions of the invention;

FIG. 2 is a reduced side elevational view of the interior of the refuse body, again with certain parts cut away for clarity of illustration;

FIG. 3 is an enlarged view of the operating components of FIG. 2;

FIG. 5 — 5A is an enlarged view of the elements of FIG. 3, and showing by a sectional view the hydraulic control valve assembly in its neutral position;

FIG. 6 is a partial sectional view of the valve assembly and related parts, with the valve spool in its extending position at the instant the blade starts its extending stroke, showing further the assembly in connection with the hydraulic circuit, the latter shown in schematic;

FIG. 7 is a sectional view of the valve and related parts with the valve spool in its extending position, and the blade in any intermediate position such that there is no contact between the valve assembly and any valve operating parts connected to the blade;

FIG. 8 is a sectional view of the valve and related parts with the valve spool in its retracting position, and the blade in any intermediate position such that there is no contact between the valve assembly and any valve operating parts on the blade;

FIG. 9 is a sectional view of the valve and related parts with the valve spool in its retracting position, and with the blade at the end of its retracting stroke;

FIG. 10 is a sectional view taken along the lines 10—10 in FIG. 7;

FIG. 11 is a sectional view taken along the lines 11—11 in FIG. 8; and

FIG. 12 is a sectional view taken along the lines 12—12 in FIG. 6.

DESCRIPTION OF THE PREFERRED EMBODIMENT

Figure 4:
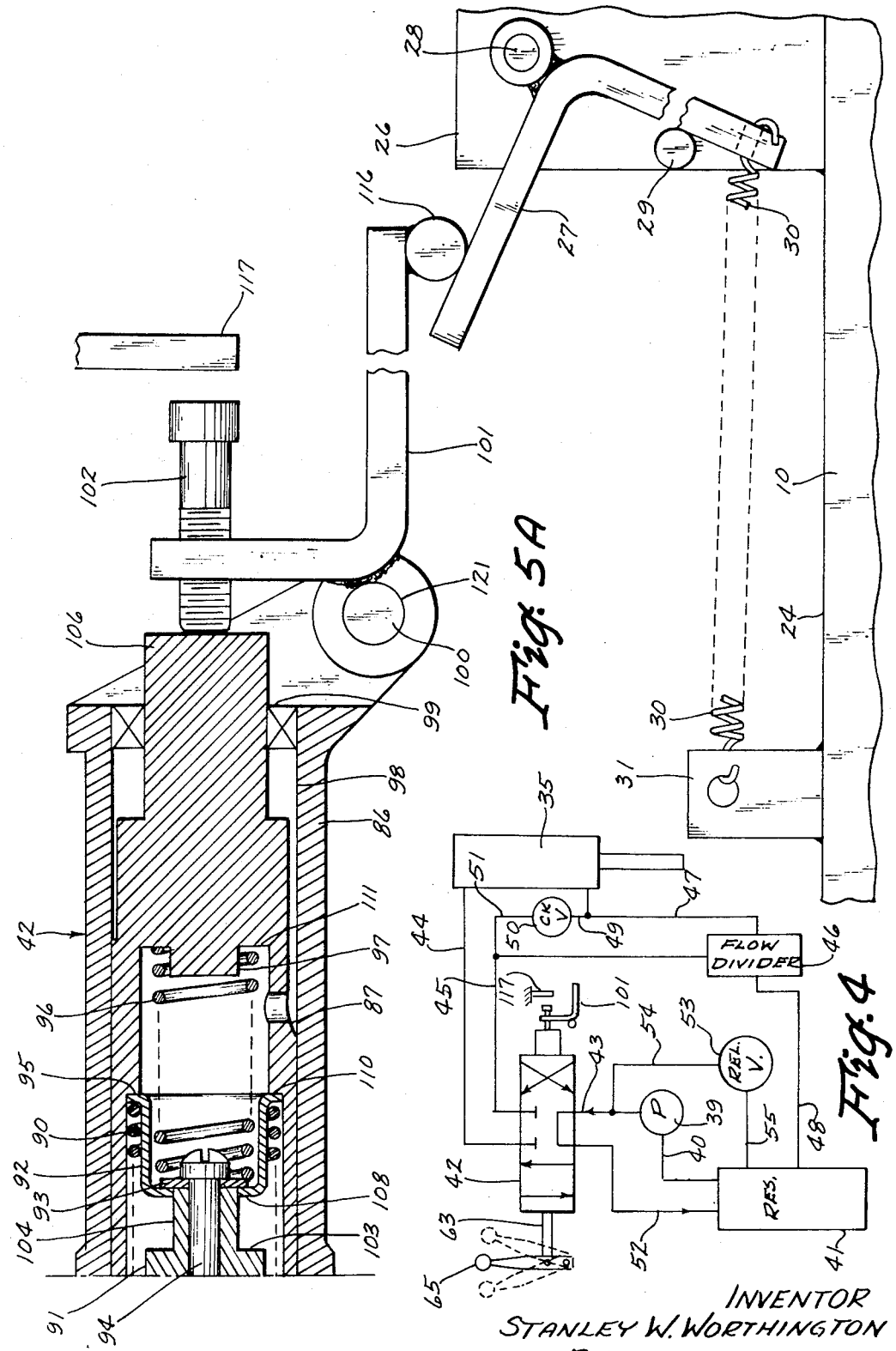
FIG. 4 is a schematic of the hydraulic circuit employed for the invention.

Referring to FIG. 1, a truck 1 is illustrated which carries a refuse body 2. The body has a floor 3, a front wall 4, side walls 5, and a top 6. An end gate 7 is pivotally attached to the body 2 at its upper edge and may be opened and closed by any suitable, conventional actuator (not shown).

An H-beam rail 8 is attached to the bottom 3 of the body along its longitudinal axis, and has an upper substantially flat surface 9 on which the reciprocating packing and unloading blade 10 is slidably mounted. The blade 10 has a frame consisting of top and bottom cross members 11 and 12 which are joined by upright members 13, 14, 15, 16 and 17. Adjacent the bottom of the blade, a projecting portion is provided, which portion slopes toward the end gate 7 and is built of diagonal members 18, 19, 20, 21 and 22, the members 18 – 22 extending from the uprights 13 – 17 and terminating in a transverse member 23. The surface 24 (FIG. 2) on the back of the blade 10 serves to contact all refuse being packed. Guides 25 work against the beam 8 support and align the blade 10.

Located on the front side of the blade 10 (FIGS. 1, 2 and 3) are the autocycle valve energizing spring and related linkage. As best shown in FIG. 3, a support 26 is attached directly to the blade 10, and an actuator bell crank 27 with an integral pivot shaft 28 is journaled on the support 26. A stop 29 secured to the support 26 limits the clockwise rotational movement of the bell crank 27 which results from the force exerted on the bell crank 27 by an extension spring 30 interconnected between the bell crank 27 and a clip 31.

Also attached to the front of the blade 10 is a support 32 (FIG. 1) which carries a wrist pin 33 connecting the piston rod 34 of a conventional double-acting hydraulic cylinder 35. The stationary end of the cylinder 35 is pivotally connected by means of an anchor pin inserted through suitable anchor brackets 37 and 38 attached to the forward end of the beam 8. Extension and retraction of the cylinder 35 effects a reciprocating movement of the packing blade 10 between its packing and/or unloading (extending) stroke, and its return or retracting stroke toward the front of the truck body 2.

It is evident that when the end gate 7 is in a raised position, any refuse within the body 2 will be discharged by the rearward movement of the blade 10. When the end gate 7 is closed, rearward movement of the blade 10 serves to compact any refuse between the blade 10, and its face 24, and the end gate 7.

Referring to FIG. 4, the basic components of the hydraulic system for the invention are illustrated. A pressure generating hydraulic pump 39 is powered from the truck transmission (not shown) through a conventional transmission power take-off (not shown). Fluid is drawn by the pump 39 through a suction line 40 from a reservoir 41, and is discharged under pressure through a pressure line 43 to a control valve 42. The control valve 42 is referred to from time to time as the autocycle valve. The valve 42 may be manually operated throughout the full operating cycle of the blade actuating cylinder 35. Subsequent to initial movement of the valve spool, as described hereinafter, to its starting position, all remaining movements of the compacting and return cycle of the blade 10 can also be controlled automatically.

A fluid line 44 connects a related cylinder port of the valve 42 with the anchor end of the cylinder 35. A fluid line 45 connects the other cylinder port of valve 42 with a conventional flow dividing means 46. The flow divider 46 delivers hydraulic fluid at a pre-determined rate through the line 47 to the piston rod end of the cylinder 35. All fluid in excess of that delivered to the rod end of the cylinder 35 is directed to the reservoir or sump 41 through a line 48.

When the autocycle valve 42 is in its neutral position, as shown schematically in FIG. 4, the ports connecting with lines 44 and 45 to the anchor and rod ends, respectively, of the cylinder 35 are blocked, preventing the flow of fluid to or from the cylinder 35 and effectively restraining it against movement. When, however, the valve 42 is in the position shown in FIG. 6, fluid delivered under pressure from the pump 39 through line 43 is directed through a line 44 to the anchor end port of the cylinder 35. This results in extending the cylinder. As the piston moves toward the rod end, fluid within the rod end of the cylinder is forced through lines 47 and 49 (FIG. 4) to a check valve 50, which opens, allowing fluid to flow through lines 51 and 45 to the valve 42, from whence the flow is directed through return line 52 to the reservoir 41.

When the valve 42 is in the position shown in FIG. 8, fluid delivered under pressure from the pump 39 through line 43 is directed through line 45 to a flow divider 46 (FIG. 4). The check valve 50 automatically closes, shutting off all flow of fluid through the check valve 50 and the line 49 to the line 47. The flow divider 46 operates to direct fluid at a pre-determined rate through the line 47 to the rod end of the double-acting cylinder 35, thereby limiting the retracting movement of the cylinder 35 and the blade 10 to a pre-determined maximum rate. All fluid delivered to the flow divider 46 (FIG. 4) in excess of that delivered through line 47 to the rod end of the cylinder 35 is directed through line 48 to the sump 41.

As fluid is introduced into the rod end of the cylinder 35, the resulting piston movement forces fluid from the cylinder anchor end out through line 44 to valve 42, thence through line 52 to sump 41.

To limit the maximum pressure generated by the pump, a relief valve 53 (FIG. 4) is set open at a predetermined pressure, and connects with the pump-to-valve line 43 through line 54. When pressure in line 43 exceeds the opening point of relief valve 53, the fluid is discharged through line 55 and back to the reservoir 41.

Figure 5:
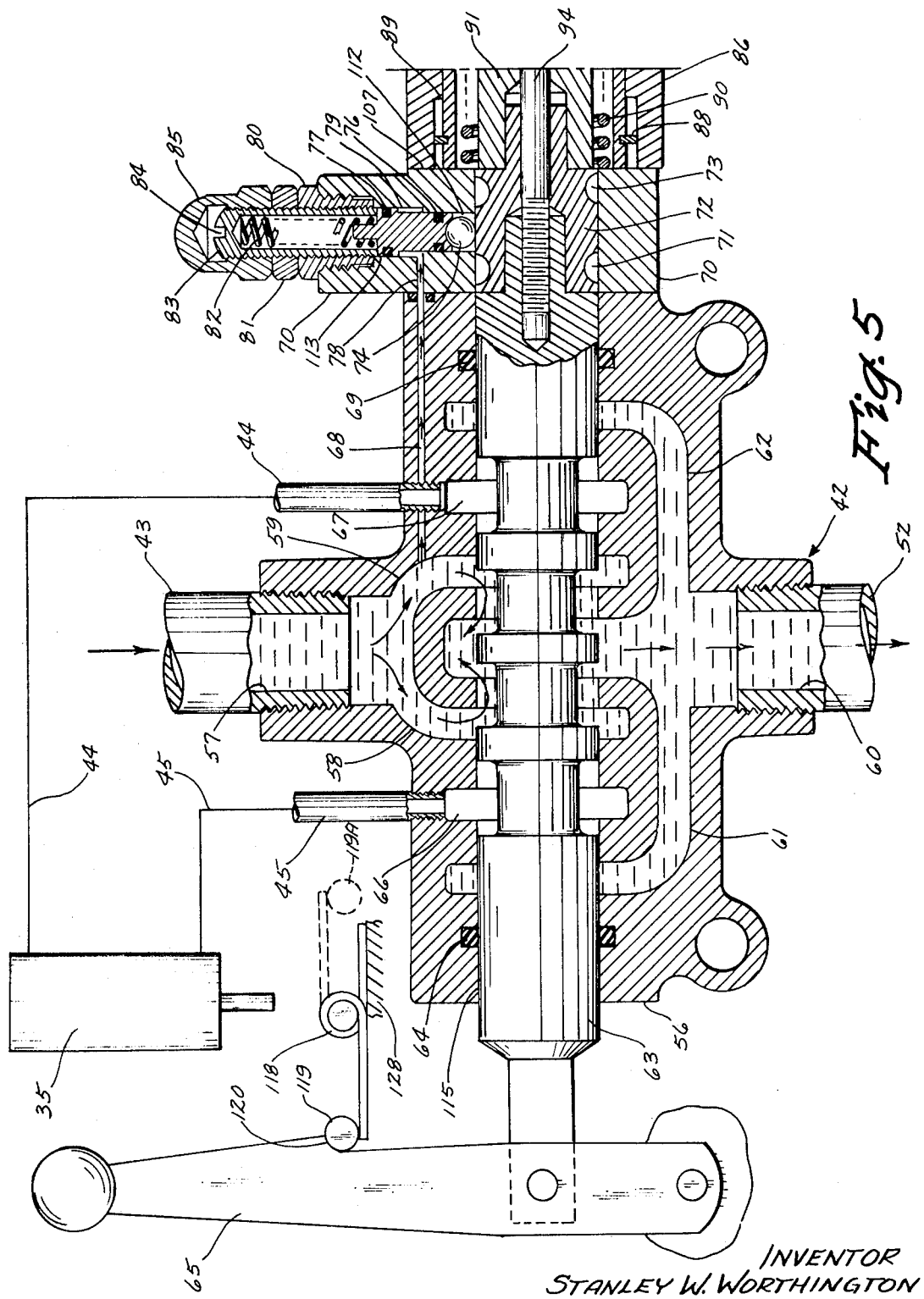

Referring to FIG. 5 – 5A, the components of the autocycle valve 42 and related parts are clearly illustrated, with the valve in its neutral position, and with the blade 10 in its most forward position as best shown in FIGS. 2 and 3.

The autocycle valve 42 includes a valve body 56 having a fluid inlet 57 formed therein for connecting a pair of internal ports 58 and 59 with the pressure line 43 from the pump 39. The ports 58 and 59 are cut off from the adjacent ports 66 and 67 by lands of the valve spool 63, but are in fluid communication with a fluid outlet 60 which connects by line 52 to the reservoir 41. The outlet 60 communicates with a pair of return ports 61 and 62, and it will be noted that leakage is prevented by a pair of seals 64 and 69 embracing the spool 63.

The spool 63 is moved longitudinally within the valve body 56 by a manually operated valve handle 65 pivotally connected to an exposed outer end of the valve spool 63 as best illustrated in FIG. 5.

A detent housing 70 is secured adjacent the valve body 56 as best shown in FIG. 5, and includes a detent sleeve 72 slidable in the bore of the housing 70 and having a pair of circular grooves 71 and 73 formed therein in longitudinally spaced relation. A detent ball 74 is held against the sleeve 72, being adapted to seat in either groove 72 or 73, by a plunger 75. The lower end of the plunger 75 has a diameter less than that of the upper end, and forms with a passage 78 a pressure chamber 79. Passage 78 is connected by a line 68 with the inlet valve body pressure port 59. Seals 76 and 77 are provided on the detent plunger 75 to prevent leakage of fluid outwardly from the pressure chamber 79.

A detent spring body 80 is seated in the housing 70 and houses a spring adjusting screw 83 which contains a detent ball spring 82 for applying adjustable pressure on the detent ball 74. The screw 83 is held by a nut 81 and cap 85, the screw 83 having a slot 84 formed in its upper end for rotation by a screwdriver or the like so as to adjust the compression of the spring 82.

Mounted adjacent the detent housing 70 is another housing 86 which has a bore 98 and shoulder 89 formed therein for containing a plunger 87 which carries a snap ring 88. The plunger 87 terminates in a circular section 106, and a dust seal 99 is mounted in the bore 98 of the housing 86 to prevent the entry of dirt or other foreign material therein. The plunger 87 moves axially within the bore 98 of the housing 86, and the axial movement of the plunger 87 toward the valve body 56 is limited by contact with the face 107 of the detent housing 70.

Travel of the plunger 87 in the opposite direction is limited by the abutment of a snap ring 88 with the shoulder 89 of the housing 86. Embracing a spacer 91 is a major actuating spring 90 which at its inner end abuts against the face 107 of the detent housing 70, and at its outer end abuts against the flange of a spring cup 92. The cup 92 in turn embraces the reduced section 102 of the spacer 91 and may move axially with respect thereto. This axial movement of the cup 92 is limited in its inward direction by contact of the outer face 108 with the shoulder 103 of the spacer 91.

The axial force of the major actuating spring 90 acts against the spring cup 92 to force it to the right as viewed in FIG. 5 — 5A, away from the face 103 of the spacer 91. Such outward movement of the cup 92 with respect to the face 103 of the spacer 91 is limited by a retaining washer 93. A screw 94 extends into a threaded hole 109 in the valve spool 63 and acts to clamp the spring cup retaining washer 93, spacer 91, detent sleeve 72, and valve spool 63 into a single functional unit so that all parts move together axially.

When the spring cup 92 is forced by the action of the major spring 90 against the retaining washer 93, any external force exerted against the cup 92 through contact with the shoulder 95 of the plunger 87, will act to further compress the spring 90 and force the cup 92 axially toward the valve body 56 until the face 108 of the cup 92 engages the shoulder 103 of the spacer 91.

A minor actuating spring 96 is provided which bottoms at its outer end against the annual face 111 of the plunger 87 with respect to the housing 86. The spring 96 is centered with respect to the plunger 87 by means of a centering lug 97. The inner end of the spring 96 contacts the outer face of the retaining wahser 93, and in this manner exerts a continuing axial biasing force opposing that of the major spring 90. In all working positions, the axial force of the major spring 90, acting to force the valve spool 63 out of the valve body 56, or to the left as viewed in FIG. 5 — 5A, is at all times sufficient to over power the opposing force of the minor spring 96.

A bell crank 101 (FIG. 5 — 5A) is integral with a pivot shaft 100 which rotates in a bearing bore 121 formed in the housing 86. Clockwise rotation of the bell crank 101 is limited by a stop 117 (See FIG. 3), and its angular position with respect to the plunger 87 may be adjusted by a screw 102 to obtain any desired attitude with respect to the axis of the valve spool 63 and all related co-axial parts.

For the purposes of this description, the operating cycle of the system is considered as starting with the packing blade cylinder 35 fully retracted (FIG. 2), the packing blade 10 in its extreme forward position, the control valve spool 63 and the control handle 65 stopped in mid-travel, and with hydraulic fluid flowing unimpeded from pump to reservoir through open ports in the valve 42. The positions of the valve spool control handle 65, packing blade 10, and related operating parts are shown in FIG. 5 — 5A in their neutral positions.

The automatic operating cycle is started by manually moving the handle 65 to the left, as viewed in FIG. 6, thus bringing the valve spool 63 into its extending position as shown in FIGS. 6 and 7. Thereafter, hydraulic fluid under pressure from the pump is directed to the anchor end of the packing blade cylinder 35, causing it to extend and force the blade 10 rearwardly in the body 2 (FIG. 2) when resistance against such rearward movement causes the hydraulic operating pressure to rise to a predetermined value, the valve spool 63 is caused to automatically move to its retracting position (FIGS. 8 and 9) as described in detail hereinafter. Fluid under pressure is then directed to the rod end of the actuating cylinder 35 (FIG. 9) causing it to retract and return the packing blade 10 to its initial forward position.

The valve spool 6 and the hand lever 65 are thereupon automatically returned to their neutral positions as shown in FIG. 5 — 5A. As the blade 10 approaches the end of its forward travel, shown schematically in FIG. 8, it brings the bell crank 27 into contact with the rod 116. A tension spring 30 acts to rotate the bell crank 27 about pivot axis 28 in a clockwise direction. Counter clockwise rotation of the bell crank 27, such as might result from an overpowering external force coming in contact with the cylindrical rod 116 of the bell crank 101 is resisted by the tension force of spring 30. This provides a controlled yielding force to compensate for normal structural and operating variations in the position of the packer blade 10 with respect to the bell crank 101.

The following contact of the bell crank 27 with the rod 116, the bell crank 27 serves to transmit the tension force of the spring 30 in such a manner as to cause the bell crank 101 to rotate about its pivot shaft 100 in a counterclockwise direction. Adjusting screw 102 is brought into contact with the end 106 of the plunger 87, and as forward movement of the blade 10 continues, the force of the spring 30 transmitted to the plunger 87 has served to bring it into the position shown in FIG. 5.

The actuator spring 30, acting through the described linkage, exerts a sufficient force to overcome the combined forces exerted by the major actuating spring 90 and the minor actuating spring 96. The major spring 90, when otherwise unrestrained, exerts sufficient axial force to overpower the minor spring 96 under all operating conditions. The major spring 90 is confined between the face 107 of the detent housing 70 and a flange 110 of the cup 92, and at all times exerts a bias force acting to move the cup 92 and the related washer 93, screw 94, spacer 91, detent sleeve 72 and valve spool 63 as a unit to the right as viewed in FIG. 5 — 5A. The force of the major spring 90, acting against the cup 92 may be restrained either by the detent ball 74, the snap ring 88, the plunger 87, or the bell crank 101 acting through the adjusting screw 102 depending upon the relative positions of the valve spool 63 and the plunger 87.

In FIG. 5 — 5A, the major spring 90 is at its mean working length. This length may be reduced by manually moving the valve spool 63 to the left, and increased by removing restraint from the plunger 87, allowing it to move to the right until restrained by contact of the snap ring 88 with the shoulder 89 of the housing 86. The minor spring 96 acts against the retaining washer 93, bringing it into firm contact with the face 108 of the cup 92. In this way, the forces of the springs 90 and 96 act to positively position the valve spool 63 in its mid-travel or centered position of FIG. 5 — 5A.

With the valve spool 63 in the neutral position shown, the hydraulic fluid flows freely from the pump through the line 43, inlet port 57, pressure ports 58 and 59 into return ports 61 and 62, and then out through the outlet port 60 to the reservoir 41. The port 67, connected with the anchor end of the cylinder 35 through line 44, and port 66 connected with the rod end of the cylinder 35 through the line 45 are both blocked by lands forming a part of the valve spool 63. This prevents movement of hydraulic fluid between the cylinder 35 and the valve 42 and effectively locks the piston of the cylinder 35 and the packing blade 10 against movement.

The pressure operated detent unit in housing 70 (FIG. 6), operates to remove restraint holding the valve spool 63 in either extending or retracting positions. Upon removal of such restraint, the position of the plunger 87 is established by the forces of the major actuating spring 90 and the minor actuating spring 96. The detent ball 74 is normally loaded by a spring 82 acting through detent plunger 75. The plunger 75 has two diameters on a common axis. The smaller diameter slides in bore 112 and the larger diameter slides in bore 113. Both diameter sections of the plunger 75 are sealed against fluid pressure by O-rings 77 and 76, respectively.

The lengths of the bores 112 and 113 and the lands on plunger 75 are such that an annular fluid chamber 79 is formed around the smaller land 75. This chamber 79 connects with the valve pressure port 59 by passages 68 in the valve body 56 and 78 in the detent housing 70. Through these communicating passages, the hydraulic pressure in the chamber 79 approximates that of the fluid entering the valve body 56 from the pump. This pressure acts on a differential area numerically equal to that of the larger diameter of the plunger 75 minus that of the smaller diameter and always acts against the force exerted by the detent spring 82 against the ball 74.

The detent ball 74 under loading of the detent spring 82 is forced into an extending groove 71 or a retracting groove 73, and thereby holds the valve spool 63 in either respective position withstanding the axial forces resulting from the major spring 90 and the minor spring 96. Since the bias of the spring 82 opposes that resulting from the pressure of hydraulic fluid against the differential pressure area of the plunger 75, the pressure at which the plunger 75 will unload the detent ball 74 and thereby remove restraint from the axial movement of the valve spool 63 may be readily changed by adjusting the working length of the spring 82. This may be accomplished by turning the adjusting screw 83 to the right or left as desired, employing the slot 84 for that purpose. The lock nut 81 may be subsequently tightened to prevent loosening of the screw 83 and thereby preserve the desired adjustment. The nut 85 serves to prevent fluid leakage.

It will be seen that whenever the valve spool 63 is moved into either the extending or the retracting position, either manually or automatically through the forces of the major and minor springs 90 and 96 respectively, it is restrained by the detent ball 74. Sufficient manual effort may be applied to the handle 65 to overpower the restraint imposed by the ball 74 and actuating springs 90 and 96, and bring the valve spool 63 into either its extending or retracting position. In this manner, manual control of the blade 10 may be taken over at any point of the operating cycle. With the blade 10 fully retracted, and all valve and related parts in the respective positions shown in FIG. 5 — 5A, automatic cycling of the blade 10 may be started by moving the operating handle 65 away from the valve body 56 as shown in FIG. 6.

As a result, the spool 63 is moved from its mid position to the left, as viewed in FIGS. 6 and 7; the pressure port 59 opens into the cylinder ports 67 allowing hydraulic fluid under pressure from the pump to flow through the line 44 to the cylinder 35, causing it to extend; the cylinder port 66 opens into the return port 61, allowing hydraulic fluid to flow freely from the rod end of the cylinder 35 through the cylinder port 66 into the return port 61, and outwardly through the outlet 60 to the reservoir 41; and the forced movement of the spring cup 92 toward the detent housing 70 creates a gap between the flange 110 of the cup 92 and the shoulder 95 of the plunger 87, reducing the working height of the major spring 90 by an equal amount and correspondingly increasing its axial compressive force to a maximum. The working height of the spring 96 has been increased an equal amount and its axial force likewise reduced. Under the force of the detent spring 82, the ball 74 has dropped into the extending detent groove 73, holding the valve spool 63 in the extending position against the bias forces exerted by the springs 90 and 96.

As the packer blade 10 moves rearwardly away from the valve 42, pressure between the bell crank 27 (FIG. 6) and the rod 116 diminishes until contact is broken, at which time changes in the positions of the relative parts are best illustrated in FIG. 7. The force of the spring 30 is no longer transmitted through the bell cranks 27 and 101 and the adjusting screw 102 to the plunger 87. The axial force of the minor spring 96 has forced the plunger 87 away from the detent housing until stopped by the contact of the snap ring 88 against the shoulder 89 of the housing 86. The gap between the cup flange 110 and the shoulder 95 of the plunger 87 has increased until it equals the travel of the spool 63 from the extending to the retracting position. With the outward movement of the plunger 87, or movement from the left to the right as viewed in FIGS. 6 and 7, the minor spring 96 has attained maximum working height and its axial force is minimal.

Under the operating force of the extending cylinder 35, the packer blade 10 continues its packing stroke until either a pre-determined resistance is encountered or the cylinder 35 reaches the end of its extending stroke. In either case, the hydraulic pressure operating the cylinder increases. When a predetermined working pressure is attained, it is transmitted through the pressure passages 68 and 78 (FIG. 7) into the annular pressure chamber 79 and acts to raise the detent plunger 75 and release the ball 74 from the detent groove 73. Unrestrained by the ball 74, the axial force of the major spring 90 overpowers the minor actuating spring 96 and forces the valve spool 63 outward or to the right in FIG. 8, until stopped by contact of the cup face 110 with the shoulder 95 of the sleeve 87.

The valve spool 63 and the handle 65 are now in their respective retracting positions. The pressure port 58 connects with the rod end cylinder port 66, allowing hydraulic fluid from the pump 39 to flow through the line 43, valve inlet 57, pressure port 58, cylinder port 66 and line 45 to the rod end of cylinder 35, causing it to retract and to return the packing blade 10 to its forward position. Simultaneously, the anchor end cylinder port 67 is opened to the return port 68, allowing fluid to freely flow from the anchor end of the cylinder 35 through line 44, cylinder port 67, return port 68, outlet 60 and return line 52 to the reservoir 41. (FIG. 8).

The detent ball 74 is forced into the retracting detent groove 71 by the force of the spring 82 and thereby positions the valve spool 63 in its retracting position. The plunger 87 is in its outer position with the snap ring 88 against the shoulder 89 of the plunger 87. The retaining washer 93 is in contact with the face 108 of the cup 92. The bias force of the minor spring 96 is overpowered by the controlling greater force of the major spring 90. The gap between the shoulder 103 on the spacer 91 and the face 122 of the cup 92 is equal to the axial movement of the valve spool 63 from retracting to extending positions.

It is under these conditions that the blade 10 continues its retracting movement. As it nears the end of its retracting movement, the bell crank 27 (FIG. 9) on the blade 10 contacts the rod 116 of the bell crank 101, whereby the yielding tension force of the spring 30 is transmitted through the adjusting screw 102 to the end 106 of the plunger 87, forcing it inwardly until stopped by contact with the face 107 of the detent housing 70, as shown in FIG. 9.

At this time, the minor spring 96 exerts a bias force against the washer 93; the valve spool 63 resists the bias force of the spring 96 due to its retention by the ball 74 in the annular detent groove 71. The gap between the inner face of the washer 93 and the face 108 of the cup 92 is equal to the axial travel of the valve spool 63 from the retracting to the neutral position.

If, due to manufacturing tolerances and/or operating deflections, the retracting movement of the blade 10 should continue after the inward movement of the plunger 87 and the counter clockwise rotation of the bell crank 101 are arrested through contact of the inner end of the plunger 87 with the face 107 of the detent housing 70, counterclockwise rotation of the bell crank 27 will continue, affecting only the operating length and tension of the spring 30. In this manner, excessive overloading and possible damage to the operating elements are eliminated.

When the blade operating cylinder 35 reaches the end of its retracting stroke, all movement stops and the operating pressure rises until the detent ball is allowed to disengage from the detent groove 71, removing all restraint against axial movement of the valve spool 63. Thus free from restraint, the bias force of the compressed minor spring 96 forces the valve spool 63 into its mid-travel, or neutral position as shown in FIG. 5, the force of the major spring 90 preventing the spool 63 from moving into the expanding position of FIG. 6.

The major spring 90, the minor spring 96, and the detent ball spring 82 may be manually overpowered by moving the operating handle 65 as desired. In this manner, movement of the cylinder 35 and the blade 10 is under the operator's control at all times. After stopping the blade 10 at any point of its extending or retracting movements by manually moving the handle 65 to its neutral position, further movement of the blade 10 in either direction may be initiated by moving the handle 65 into its appropriate retracting or extending positions. When the spool 63 is so moved, it will thereafter be retained by the detent ball 74 in cooperation with the grooves 71 or 73. Should the extending movement of the blade 10 be so initiated at any point between its extremes of travel, it will automatically continue throughout the unexpired portion of its cycle and eventually be brought to a stop at the end of its retracted stroke, at which time the valve spool 63 will be automatically returned to its neutral position as previously described.

It will be seen that whenever the valve spool 63 is so positioned that the detent ball 74 engages neither the groove 71 nor 73, and the plunger 87 is free of restraint from the bell crank 101, the springs 90 and 96 will cause the valve spool 63 to assume the retracting position shown in FIG. 8. In order to avoid this condition, a manually operated means is provided to hold the operating handle 65 and the valve spool 63 in their respective neutral positions. Referring to FIG. 5, a hinge 118 is attached to any suitable anchoring point 128 and may be brought into its full line position such that the flip bar 119 engages a suitable detent shoulder 120 formed in the handle 65, and restrains the handle against any clockwise rotary movement resulting from the loading imposed by the major spring 90 acting through the valve spool 63. In this way, the handle 65 and the valve spool 63 are both effectively held in their mid-travel or neutral positions, and movement of the cylinder 35 and the blade 10 are hydraulically locked. The holding effect of the hinge 118 and the flip bar 119 may be eliminated by moving them to their dotted line position as shown.

When travel of the actuating cylinder 35 and the packing blade 10 is arrested at any point by holding the control handle 65 and the valve spool 63 in their respective neutral positions, with the axial position of the plunger 87 not determined by the spring 30 (FIG. 6) acting through the bell cranks 27 and 101, the remaining valve operating parts are positioned as follows: hydraulic fluid circulates freely from the pump to the reservoir through the valve 42, the detent ball 74 bears against the outer cylindrical surface of the detent sleeve 72 at a point midway between the grooves 71 and 73, the bias force of the minor spring 96 forces the sleeve 87 outwardly until restrained by contact of the snap ring 88 with the shoulder 89 of the housing 86, and the gap between the face 110 of the cup 92 and the shoulder 95 of the plunger 87 is equal to one half the total travel of the valve spool 63.

Telescoping cylinders employing multiple pistons of different sizes are commonly made so that the volume of the hydraulic fluid necessary to extend the cylinder may be much greater than that required to retract it. With hydraulic fluid delivered to such a cylinder maintained at a given rate, the retracting speed will therefore be considerably greater than that of extending. This results in substantially increasing the rate of hydraulic fluid return flow from the anchor end of the cylinder as compared with that from the rod end thereof. Such a high rate of return flow has been found to significantly increase the back pressure acting against the piston, so that for a given external resistance to piston travel, the operating pressure is comparably higher to a point where it may adversely affect the operation of the hydraulic detent in a valve of the type covered by this invention.

To effect dependable operation of such a valve, it may become advisable to limit the rate of hydraulic fluid flow to the rod end of the cylinder by means of a flow divider. Such divider may be adjusted so that the rate of flow from the anchor end of the cylinder during the retracting stroke remains at a rate which will not seriously affect the operation of the valve. Such flow dividers are well known in this art and can be depended to deliver fluid to the primary outlet (cylinder) at a fixed rate, with all excess fluid delivered back to the reservoir, but their use for the purposes described is believed new to this art.

I claim:

1. Apparatus for controlling the direction of movement of a compacting and unloading blade movably mounted for longitudinal movement within a refuse vehicle body, the body having a front end and a rear end between which the blade moves, and including further a fluid operated cylinder device operably connected between the front end and the blade for moving the blade in an extending, compacting manner toward the rear end and in a retracting manner toward the front end, the apparatus comprising;

a fluid pressure system including a pump and a reservoir;

valve means in said system mounted on the body in fluid communication with said device, and having a neutral position, a device extending position, and a device retracting position;

manually operated handle means mounted on the body for manually positioning said valve means into any one of said positions;

detent means associated with said valve means for releasably holding said valve means in either of said device extending and device retracting positions;

plunger means relatively movable with said detent means and having a first position and a second position;

rocker arm means mounted on the blade and engageable with said plunger means when the blade is in its retracted position, and holding said plunger means in its first position, said rocker arm means movable away from said plunger means upon extending movement of the blade;

biasing means interposed between said detent means and said plunger means for biasing said valve means via said detent means into the neutral position when said plunger means is in said first position, said biasing means operable to bias said valve means from the device extending position to the device retracting position when said plunger means is in its second position; and fluid pressure means in said system and associated with said detent means for releasing said detent means holding said valve means upon the pressure of the system reaching a predetermined value at the end of both the device extending movement and the device retracting movement, said biasing means operable to move said valve means upon release thereof by said detent means.

2. Apparatus as defined in claim 1 wherein said valve means includes a three position spool valve mounted for axial movement within a valve body having a pair of pressure inlet ports, a pair of pressure outlet ports in fluid communication with opposite ends of the cylinder device, and a pair of exhaust ports.

3. Apparatus as defined in claim 2 wherein said detent means includes a detent body secured to said spool valve for axial movement therewith in said valve body, said detent body having a pair of longitudinally spaced grooves formed therein, a ball, a spring biased plunger forcing said ball against said detent body in a neutral position, and into either of said grooves in either the device extending or the device retracting positions, and a detent cup mounted on said detent body for axial relative movement thereto.

4. Apparatus as defined in claim 3 wherein said plunger means includes a plunger axially movable within said valve body between a first position against said detent body and a second position against a shoulder former within said valve body spaced from said detent body, and a rocker arm pivotally mounted on said valve body and engageable with an outer end of said plunger for moving said plunger from said second position to said first position, said rocker arm engageable by said rocker arm means.

5. Apparatus as defined in claim 4 wherein said biasing means includes a primary spring inserted between said valve body and said detent cup and biasing said detent cup, detent body and spool valve toward the device retracting position, and a secondary spring inserted between said detent cup and said plunger and biasing said detent cup, detent body and spool valve toward the device extending position, said springs operable with said plunger in its first position to force said spool valve to the neutral position, and with said plunger in its second position to force said spool valve to the device retracting position.

6. Apparatus as defined in claim 5 wherein said fluid pressure means includes a housing for said detent spring biased plunger and having a chamber formed within said housing in fluid communication with said pump for receiving fluid pressure therefrom, said plunger having a section of a diameter within said chamber smaller than another section thereof whereby said pressure acts to force said spring biased plunger away from said detent ball such that said primary and secondary springs are operable to overcome the force of said detent ball in either of said grooves and to move said spool valve.

7. Apparatus for controlling the direction of movement of a load movably mounted for longitudinal movement, and including further a fluid operated device operably connected with the load for reciprocating the load between two positions, the apparatus comprising;
  a fluid pressure system;
  valve means in said system in fluid communication with said device, and having a neutral position, a device force applying position, and a device force released position;
  handle means for positioning said valve means into any one of said positions;
  detent means associated with said valve means for releasably holding said valve means in either of said positions;
  positioning means relatively movable with respect to said valve means and having a first position and a second position;
  movable means engageable with said positioning means when the load is in one position, and holding said positioning means in its first position, said movable means movable away from said positioning means upon movement of the load out of said one position;
  biasing means for biasing said valve means into the neutral position when said positioning means is in said first position, said biasing means operable to bias said valve means from the device force applying position to the device force released position when said positioning means is in its second position; and
  fluid pressure means in said system and associated with said detent means for releasing the hold of said detent means on said valve means in response to the pressure of the system reaching a predetermined value when the load is in either of its two positions, said biasing means operable to move said valve means upon release thereof by said detent means.

8. Apparatus for controlling the application of force to a load by a fluid operated device operably connected to the load for moving the load from one position to another position, comprising:
  a fluid pressure system;
  valve means in said system in fluid communication with said device and having a neutral position, a second position wherein said device is moving the load from one position to the other position, and a third position where the device is returning the load from the other position to the one position;
  handle means for positioning said valve means into one of said positions;
  detent means for releasably holding said valve means against movement in either said second position or said third position;
  positioning means relatively movable with said valve means and having a first position and a second position, said positioning means responsive to the load in the one position of said load;
  biasing means tending to maintain said valve means in said neutral position, said biasing means operable to move said valve means from said second position to said third position upon release of said valve means by said detent means, said biasing means operable to move said positioning means from said first position to said second position upon release of said valve means by said detent means, said biasing means responsive to said positioning means when the load assumes its one position to return said valve means to said neutral position; and
  fluid pressure means in said system associated with said detent means for controlling the hold of said detent means on said valve means in response to the pressure of the system reaching a predetermined valve upon the load moving into either of its two positions.

9. Apparatus as described in claim 8 and further wherein said valve means includes a movable valve body having a pair of depressions formed therein; said detent means includes an element normally biased into engagement with either of said valve body depressions, said element bias overcome by said fluid pressure at a predetermined value thereof; and said biasing means including a major operating spring tending to move said valve body from said second position to said third position, and a minor centering spring tending to move said valve body into said neutral position.

10. Apparatus as described in claim 9 and wherein said biasing means comprises a major operating spring and a minor centering spring, said major spring having a strength of expansion greater than that of said minor spring when both are compressed, said major spring operable to move said valve means from said second position to said third position upon release of said load upon said positioning means, and said minor spring tends to move said valve body to said neutral position.

11. Apparatus as described in claim 10, and wherein said major spring is capable, when fully extended, to simultaneously move said valve body from said second position to said third position while overcoming the expansion force of said minor spring in its fully compressed condition.

12. Apparatus as described in claim 10 and wherein the force of said major spring holding said valve means in said third position is removed by action of said positioning means, whereupon said minor spring is operable alone to return said valve means to said neutral position upon release of said valve body by said detent element.

13. Apparatus as described in claim 10, and wherein said minor spring is compressed in either of said valve means second and third positions, and when compressed acts to maintain said valve means in its neutral position.

* * * * *